(12) United States Patent
Kleemann

(10) Patent No.: US 8,441,729 B2
(45) Date of Patent: May 14, 2013

(54) OPTICAL ARRANGEMENT, METHOD OF USE, AND METHOD FOR DETERMINING A DIFFRACTION GRATING

(75) Inventor: Bernd Kleemann, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 352 days.

(21) Appl. No.: 12/822,415

(22) Filed: Jun. 24, 2010

(65) Prior Publication Data

US 2010/0328775 A1 Dec. 30, 2010

(30) Foreign Application Priority Data

Jun. 26, 2009 (DE) .................. 10 2009 031 688

(51) Int. Cl.
*G02B 5/18* (2006.01)
*G02B 27/44* (2006.01)

(52) U.S. Cl.
USPC ........... 359/571; 359/574; 359/566; 359/569; 359/570; 359/576

(58) Field of Classification Search .................. 359/571, 359/574, 566, 569, 570, 576
See application file for complete search history.

(56) References Cited

U.S. PATENT DOCUMENTS

| 6,067,197 | A | 5/2000 | Blasiak et al. |
| 6,762,881 | B2 | 7/2004 | Kleemann et al. |
| 2007/0030483 | A1* | 2/2007 | Everett et al. ................. 356/328 |

FOREIGN PATENT DOCUMENTS

DE 102 04 141 8/2003

OTHER PUBLICATIONS

A. Marechal and G.W. Stroke, "Sur l'origine des effects de polarization et de diffraction dans les réseaux optiques", C.R. Ac Sc. 249, 2042-2044 (1959), with English translation.
Erwin G. Loewen and Evgeny Popov, "Diffraction Gratings and Applications", Marcel Dekker Inc., New York, 1997, Chapter 2, 2.7 *Diffraction Efficiency*, pp. 35-42.

* cited by examiner

*Primary Examiner* — Scott J Sugarman
*Assistant Examiner* — Robert E Tallman
(74) *Attorney, Agent, or Firm* — Fish & Richardson P.C.

(57) ABSTRACT

An optical arrangement includes a light source which emits coherent light of a wavelength λ, and a diffraction grating which has a multiplicity of diffraction structures which follow one another periodically at the spacing of a grating period d and are arranged along a base surface, the individual diffraction structures respectively having a blaze flank and an antiblaze flank, the blaze flanks being arranged at an angle β and the antiblaze flanks being arranged at an angle α to the base surface, and respectively neighbouring blaze and antiblaze flanks enclosing an apex angle γ, and an incident light beam being arranged at a Littrow angle $\theta_L$ relative to a grating normal of the diffraction grating. The angle β of the blaze flanks to the base surface is selected as a function of the Littrow angle $\theta_L$ such that the diffraction efficiency is at least approximately maximal in one of the largest diffraction orders m, which still fulfils the condition $(2((m+1)/m)-1)\sin \theta_L \geq 1$, and for at least one polarization direction.

22 Claims, 5 Drawing Sheets

US 8,441,729 B2

OPTICAL ARRANGEMENT, METHOD OF USE, AND METHOD FOR DETERMINING A DIFFRACTION GRATING

CROSS-REFERENCE TO RELATED APPLICATION

The application claims priority under 35 U.S.C. §119 to German Patent Application No. 10 2009 031 688.4 filed on Jun. 26, 2009, the entire contents of which are hereby incorporated by reference.

FIELD

The disclosure generally relates to optical arrangements having diffraction gratings, and to diffraction gratings, such as an optical arrangement, including a light source which emits coherent light of a wavelength (λ), and a diffraction grating which has a multiplicity of diffraction structures which follow one another periodically at the spacing of a grating period (d) and are arranged along a base surface, the individual diffraction structures respectively having a blaze flank and an antiblaze flank, the blaze flanks being arranged at an angle (β) and the antiblaze flanks being arranged at an angle (α) to the base surface, and respectively neighbouring blaze and antiblaze flanks enclosing an apex angle (γ), and an incident light beam being arranged at a Littrow angle ($\theta_L$) relative to a grating normal of the diffraction grating. The disclosure also relates to a method of use of an optical arrangement of this type. The disclosure further relates to a method for determining a diffraction grating of increased diffraction efficiency.

BACKGROUND

A diffraction grating is an arrangement composed of a multiplicity of reflecting or transmitting diffraction structures which follow one another periodically at the spacing of a grating period (d). The diffraction structures can be light-transmitting slits or openings in a screen, or an aggregation of reflecting channels or grooves on a substrate. Light which falls onto a diffraction grating is diffracted at the diffraction grating.

A class of optical diffraction gratings which are termed echelle gratings, or simply echelles. Each individual diffraction structure in the form of a grating flute or grating line has a profile which consists of two edges, a short edge, which is also termed a blaze flank, and a long flank, which is also termed an antiblaze flank. The blaze flank and the antiblaze flank form together with the base surface a triangular profile, which is also termed a blaze profile.

An optical arrangement provided with the general reference numeral 100 and having a diffraction grating 102 is illustrated for explanatory purposes in FIG. 1. Two diffraction structures 104 of the multiplicity of diffraction structures are illustrated from the diffraction grating 102. A base surface of the diffraction grating 102 is provided with the reference numeral 106. The diffraction structures 104 each have a blaze flank 108 and an antiblaze flank 110.

Each blaze flank 108 is inclined at an angle β to the base surface 106, and each antiblaze flank 110 is inclined at an angle α to the base surface 106. Each blaze flank 108 encloses a so-called apex angle γ with the neighbouring antiblaze flank 110. It holds for the apex angle γ that: γ=180°−α−β.

When a light beam 112 with light of a wavelength λ is incident on the diffraction grating 102, the light is diffracted in many discrete directions, these directions being termed diffraction orders. The number of the diffraction orders is finite and is governed by the ratio of the grating period d of the diffraction grating to the wavelength λ of the incident light and is, moreover, dependent on the incidence angle $\theta_e$ at which the light beam 112 falls onto the diffraction grating 102. The directions $\theta_m$ of the diffraction orders m are described by the following grating equation, m being the number of the respective diffraction order:

$$m \cdot \frac{\lambda}{d} = (\sin\theta_e + \sin\theta_m). \tag{1}$$

The angles $\theta_e$ and $\theta_m$ are measured in relation to the grating normal GN, which is perpendicular to the base surface 106 in FIG. 1.

Echelle gratings are usually operated in a high diffraction order m and at a large diffraction angle $\theta_m$. Common diffraction angles $\theta_m$ lie mostly between 63° and 85°. Used diffraction orders m frequently lie between 30 and 150, it also being possible for extreme diffraction orders m to lie at about 600. Advantageous properties of echelle gratings are a high angular dispersion and a high resolution, as well as a relatively high diffraction efficiency over a large spectral range, and being relatively free from polarization effects.

Diffraction efficiency in a specific diffraction order m is understood as the ratio of the intensity of the light diffracted in this diffraction order m to the intensity of the incident light, and can correspondingly be at most 1.0 or 100%, assuming that no absorption occurs in the diffraction grating. However, in a real case, because of absorption during the diffraction at metal gratings, the sum of all the diffraction efficiencies is always smaller than 100%, while it can be 100% only in the ideal case of an ideally conducting material of infinite conductivity. The same holds in the case of a transmissive diffraction grating when the material is purely transmissive.

Moreover, in the case of the diffraction orders m a distinction is made between the so-called propagating diffraction orders and the non-propagating diffraction orders. Non-propagating diffraction orders are invisible and are also sometimes termed as "lying below the horizon". The grating equation (1) describes the propagating diffraction orders.

As the diffraction efficiency in the individual diffraction orders is very different, an attempt is made in many applications to direct as much light as possible into a single diffraction order. This effect is denoted as a blaze effect, and the corresponding diffraction order is termed a blaze order. Neighbouring diffraction orders of the blaze order can in this case still include a considerable fraction of the diffracted light.

In some applications, it is the so-called Littrow arrangement that is selected for the optical arrangement which includes the diffraction grating. As illustrated in FIG. 1, in the Littrow arrangement the diffraction grating is orientated to the incident light beam 112 such that the emergent light beam 114 of blaze order m is diffracted back in the same direction from which the incident light beam 112 comes. It holds in this case that $\theta_e = \theta_m = \theta_L$, with $\theta_L$ being denoted as the Littrow angle.

In the document U.S. Pat. No. 6,067,197, the diffraction grating is orientated in a Littrow arrangement. The diffraction structures of the diffraction grating are configured in the case of the known optical arrangement such that the blaze flanks of the grating are struck by the incident light beam virtually perpendicularly, that is to say it holds that $\theta_L=\beta$, that is to say Littrow angle $\theta_L$ and blaze angle $\beta$ of the blaze flanks are virtually equal.

The grating equation (1) is simplified to $$\sin\theta_L = m\frac{\lambda}{2d} \qquad (2)$$

in the Littrow arrangement in which $\theta_L=\theta_e=\theta_m$.

In the case of a grating configuration in which the blaze order is the last propagating diffraction order, it emerges that this blaze order has a somewhat higher diffraction efficiency for echelle gratings in a Littrow arrangement than a blaze order in another diffraction order. There are also blaze arrangements in which after the blaze order there is still at least one further diffraction order which has a larger number and which is therefore diffracted at a larger angle than the blaze order.

In the case of the optical arrangement in accordance with U.S. Pat. No. 6,067,197, the grating period d of the diffraction grating and the Littrow angle $\theta_L$ can be matched such that, as it were, a high blaze action is reached for two wavelengths $\lambda_1$, $\lambda_2$ by operating the diffraction grating for two wavelengths $\lambda_1$, $\lambda_2$ in two different last propagating blaze orders $m_1$, $m_2$. As already mentioned, in the case of this known arrangement the Littrow angle $\theta_L$ is virtually equal to the angle $\beta$ of the blaze flanks to the base surface of the diffraction grating.

A further optical arrangement including a diffraction grating is known from the document U.S. Pat. No. 6,762,881; here, the optical wavelength $\lambda$, the grating period d and the Littrow angle $\theta_L$ are matched such that use is made for light retroreflected in the Littrow angle $\theta_L$ of the diffraction grating in one of the largest diffraction orders m which still fulfils the condition $(2((m+1)/m)-1)\sin\theta_L \geq 1$. An aim of this known arrangement is to achieve an increased diffraction efficiency.

A further detailed description of diffraction gratings, in particular echelle gratings, is to be found in the technical book by Erwin G. Loewen and Evgeny Popov entitled "Diffraction Gratings and Applications", Marcel Dekker Inc., New York, 1997. It is defined there that the blaze effect, that is to say the property of diffraction gratings to concentrate the diffracted light in a specific diffraction order, is perfect when no light goes in another direction than in the blaze order, the absolute diffraction efficiency being limited only by absorption losses and diffuse scattering. Although the production of diffraction gratings continued to be improved yet further, some diffraction gratings do not, however, display a perfect blaze effect, that is to say in addition to the diffracted light of the desired blaze order, whose intensity has a maximum, light is also always to be found in further diffraction orders which therefore subtract intensity from the desired blaze order.

A theorem which attempts to explain the conditions under which there can be a perfect blaze effect was formulated to this end in a paper by A. Marechal and G. W. Stroke entitled "Sur l'origine des effets de polarisation et de diffraction dans les réseaux optiques" ["On the origin of the effects of polarization and of diffraction in optical gratings"], C. R. Ac. Sc. 249, 2042-2044 (1980). According thereto, it is possible very generally for a grating with a plurality of diffraction orders to exhibit an optimal blaze effect in a blaze order when the diffraction grating profile is a triangular profile with an apex angle $\gamma$ of 90°. The abovementioned paper then also specified physical reasons for this selection for the case of ideal conductivity and in TM polarization of the light. It is possible to substantiate for this case that no light goes into other diffraction orders and that, therefore, a perfect blaze effect is present. A reflecting material with ideal conductivity reflects incident light at 100% and therefore has no losses which could extract energy from the incident light. However, the theorem from the paper loses its validity for TE polarization, in the case of which other conditions placed on the electromagnetic optical field are present than in the case of TM polarization.

In the abovenamed technical book the conclusion is drawn therefrom that a perfect blaze effect in the TE polarization can exist for other incidence angles, but that the diffraction efficiency in the TE polarization can never be 100% when a perfect blaze effect occurs in the TM polarization.

In certain known optical arrangements and known diffraction gratings, the blaze effect can depend relatively strongly on the accuracy of manufacturing of the diffraction structures. In instances, the angle $\beta$ of the blaze flanks relative to the base surface of the diffraction grating lies in a very narrow specification and is allowed to have at most a deviation of approximately 0.5° in relation to an optimum angle $\beta'$. An overshooting of this angular tolerance can lead to a steep drop in the efficiency of response of the diffraction grating in the selected configuration.

SUMMARY OF THE DISCLOSURE

The disclosure provides an optical arrangement that provides an improved blaze effect.

According to an aspect of the disclosure, an optical arrangement is provided, including a light source which emits coherent light of a wavelength $\lambda$, a diffraction grating which has a multiplicity of diffraction structures which follow one another periodically at the spacing of a grating period d and are arranged along a base surface, the individual diffraction structures respectively having a blaze flank and an antiblaze flank, the blaze flanks being arranged at an angle ($\beta$) and the antiblaze flanks being arranged at an angle $\alpha$ to the base surface, wherein respectively neighbouring blaze and antiblaze flanks enclosing an apex angle ($\gamma$,) an incident light beam of the wavelength ($\lambda$) being arranged at a Littrow angle ($\theta_L$) relative to a grating normal of the diffraction grating, wherein the angle ($\beta$) of the blaze flanks to the base surface is selected as a function of the Littrow angle ($\theta_L$) such that the diffraction efficiency is at least approximately maximal in one of the largest diffraction orders m, which still fulfils the condition $(2((m+1)/m)-1)\sin\theta_L \geq 1$, and for at least one polarization direction.

The optical arrangement according to the disclosure departs from the known concept of tuning the Littrow angle $\theta_L$ to the grating such that the Littrow angle $\theta_L$ is virtually equal to the angle $\beta$ of the blaze flanks to the base surface of the diffraction grating. By contrast, the disclosure proceeds from another concept, specifically of selecting for a given Littrow angle the angle $\beta$ of the blaze flanks to the base surface as a function of the Littrow angle, and indeed such that the diffraction efficiency is at least approximately maximal in one of the largest propagating diffraction orders m, which still fulfils the condition $(2((m+1)/m)-1)\sin\theta_L \geq 1$, and for at least one polarization direction (TE or TM). To be precise, it has surprisingly been found that the diffraction efficiency in the blaze order can be increased when the angle $\beta$ deviates from the Littrow angle $\theta_L$ by more than the maximum value of 1° permitted in the prior art. As stated in yet more detail in the following description, it is thereby possible to achieve a perfect blaze effect of 100% in the case of a diffraction grating made from an ideally conducting material, specifically for both polarization directions, and for materials of finite conductivity the diffraction efficiency in the blaze order is reduced only by the absorption of the light by the material. The present disclosure can be used to disprove the property, assumed as known in the abovenamed technical book and the abovenamed paper, that a perfect blaze effect in both polarization directions is impossible. The disclosure thus enables the use of substantially better diffraction gratings than is the case in the prior art.

In some refinements, the angle ($\beta$) of the blaze flanks to the base surface lies in an angular range in which the diffraction efficiency for the at least one polarization direction changes only slightly with a variation in the angle ($\beta$).

This measure now has the particular advantage that substantively lesser requirements are to be placed on the manufacturing tolerance of the diffraction grating. To be precise, the angle $\beta$ of the blaze flanks can be selected from a specific angular range of a few degrees, or can vary in this angular range, without the diffraction efficiency in the blaze order dropping appreciably from the maximum. This angular tolerance of the blaze flanks is enabled firstly by the disclosure, specifically by the selection of the angle $\beta$ of the blaze flanks to the base surface as a function of the Littrow angle $\theta_L$.

In certain refinements, the angle ($\beta$) of the blaze flanks to the base surface is larger than the Littrow angle ($\theta_L$) by at least 1.5°, such as, for example, by at least 2° or by at least 4°.

It can be desirable, furthermore, in this case if the angle ($\beta$) of the blaze flanks to the base surface is larger than the Littrow angle ($\theta_L$) by a value in a range from 2° to approximately 10°, and such as in a range from approximately 4° to approximately 8°.

It has emerged surprisingly that, with a selection of the angle $\beta$ of the blaze flanks to the base surface of the diffraction grating in the abovementioned angular ranges, the diffraction efficiency in the blaze order is very high and is also the maximal diffraction efficiency in this range, that is to say a perfect blaze effect occurs, and on the other hand the dependence of the diffraction efficiency on the angle $\beta$ is also low.

In some refinements, the angle ($\beta$) of the blaze flanks to the base surface is selected as a function of the Littrow angle such that the diffraction efficiency is at least approximately maximal in one of the largest propagating diffraction orders m, for which the condition $(2((m+1)/m)-1)\sin \theta_L \geq 1$ is still fulfilled, and for both polarization directions (TE and TM).

This measure increases the total diffraction efficiency in the blaze order still further, because the selection of the angle $\beta$ of the blaze flanks to the base surface is optimized as a function of the Littrow angle for both polarization directions. Admittedly, this narrows down the angular range from which the angle $\beta$ of the blaze flanks to the base surface can be selected, and it thereby also depresses the angular tolerance of the angle $\beta$, but the total diffraction efficiency in the blaze order considered is further increased.

In certain refinements, the apex angle ($\gamma$) is 90°, if appropriate with a maximum deviation of 1.5° therefrom.

It is true that diffraction gratings with an apex angle $\gamma$ of 90° are known per se, but an apex angle of 90° has proved to be particularly advantageous precisely in conjunction with the present disclosure, specifically with the selection of the angle $\beta$ of the blaze flanks to the base surface as a function of the Littrow angle, when what is involved is the maximal diffraction efficiency in both polarization directions TE and TM. Specifically, other apex angles $\gamma$ which deviate from 90° by more than 1.5° are also possible in the scope of the disclosure, but the maximal diffraction efficiency which can be achieved then no longer corresponds to the perfect blaze effect.

In a practical exemplary embodiment, the angle ($\beta$) of the blaze flanks lies in the range from 81° to 87°, such as, for example, in the range from 82° to 86°, given a Littrow angle ($\theta_L$) in a range from 78° to 80°.

Using such an optical arrangement and such a diffraction grating, a diffraction efficiency at least near the perfect blaze effect which simultaneously includes a high angular tolerance of the angle ($\beta$) is attained.

In certain refinements of the optical arrangement, the diffraction grating is additionally inclined by an inclination angle ($\delta$) to the incidence plane of the light beam.

In order, for example, to separate the incident and the emergent light beams from one another, diffraction gratings are sometimes additionally inclined to the incidence plane of the light beam. This mode of procedure is likewise possible in the Littrow arrangement. With reference to the present disclosure, it has emerged in the case of an inclination of the diffraction grating to the incidence plane of the light beam additionally by an inclination angle $\delta$ that the diffraction efficiency depends on the inclination angle $\delta$ and can be further increased by an increasing, non-vanishing inclination angle $\delta$ given a "perfect" angle $\beta$ of the blaze flanks to the base surface as compared with the noninclined arrangement of the diffraction grating. Thus, it has emerged that for inclination angles $\delta$ which are above 60° the diffraction efficiency rises further given a "perfect" angle $\beta$ and reaches close to 100% at 90°, at least for the polarization direction TM.

It can correspondingly be desirable in the case of the optical arrangement when the inclination angle ($\delta$) lies in the range from 35° to near 90°.

In the scope of the disclosure, the blaze order considered can be the largest possible last propagating diffraction order (L), but can also deviate from the latter by a number which lies in the range from 1 to 20, such as, for example, from 1 to 10.

A method of use according to the disclosure of an optical arrangement in accordance with one of the abovenamed refinements consists in the use of the diffraction grating as an end mirror for bandwidth narrowing in a laser resonator.

In the event of such a use, the useful properties of the optical arrangement according to the disclosure, specifically maximal diffraction efficiency in the blaze order with less-diffracted light in other diffraction orders, can be used with particular advantage.

According to another aspect of the disclosure, a method for determining a diffraction grating of increased diffraction efficiency in a high diffraction order, the diffraction grating having a multiplicity of diffraction structures which follow one another periodically at the spacing of a grating period (d) and are arranged along a base surface, the individual diffraction structures respectively having a blaze flank and an antiblaze flank, the blaze flanks being arranged at an angle ($\beta$) and the antiblaze flanks being arranged at an angle ($\alpha$) to the base surface, and respectively neighbouring blaze and antiblaze flanks enclosing an apex angle ($\gamma$), including the steps of:

fixing a Littrow angle ($\theta_L$) at which coherent light of a wavelength ($\lambda$) is to be incident on the diffraction grating relative to a grating normal of the diffraction grating, selecting a diffraction order m which belongs to the largest propagating diffraction orders for the Littrow angle ($\theta_L$) and still satisfies the condition $(2((m+1)/m)-1)\sin \theta_L \geq 1$, determining the grating period (d) in accordance with the equation: $d=m\lambda/(2 \sin \theta_L)$, and selecting the angle ($\beta$) of the blaze flanks to the base surface as a function of the diffraction order m and the grating period (d) from an angular range in which the diffraction efficiency in the diffraction order m is at least approximately maximal.

The diffraction order m can be determined as the largest possible last propagating diffraction order L in accordance with the equation:

$$L=\max_{m\geq 1,\ m\in\mathbb{N}}\{(2((m+1)/m)-1)\cdot\sin\theta_L \geq 1\}$$

The abovenamed equation for the largest possible last diffraction order L constitutes a sufficient condition for the diffraction grating with a perfect blaze effect. However, it is also possible to select a diffraction order m which deviates from the largest possible last order by a number from 1 to 10, for example.

As already mentioned above, the angle ($\beta$) of the blaze flanks to the base surface can be selected from an angular range in which the diffraction efficiency for at least one polarization direction (TE or TM) changes only slightly with a variation in the angle ($\beta$).

The angle $\beta$ of the blaze flanks to the base surface can be selected such that the diffraction efficiency of both polarization directions (TE and TM) is at least approximately maximal.

In this case, the apex angle ($\gamma$) can be 90° with a maximum deviation of 1.5°.

In the case of an arrangement of the diffraction grating which is inclined to the incidence plane by an inclination angle ($\delta$), the grating period (d) is determined with the aid of the equation: $d=m\lambda/(2\sin\theta_L \cos\delta)$, with $0<\delta<90°$.

Further advantages and features emerge from the following description and the attached drawing.

It goes without saying that what has been mentioned above and features still to be explained below can be used not only in the respectively specified combination, but also in other combinations or on their own without departing from the scope of the present disclosure.

BRIEF DESCRIPTION OF THE DRAWINGS

Exemplary embodiments of the disclosure are illustrated in the drawing and will be described in more detail hereinafter with reference thereto. In the drawings:

FIG. 7 shows the case in which the diffraction grating is inclined at an inclination angle $\delta$ to the incidence plane of the light beam.

FIG. 8 shows an exemplary arrangement where the diffraction grating is inclined at an inclination angle $\delta$.

DETAILED DESCRIPTION OF PREFERRED EXEMPLARY EMBODIMENTS

Figure 1:
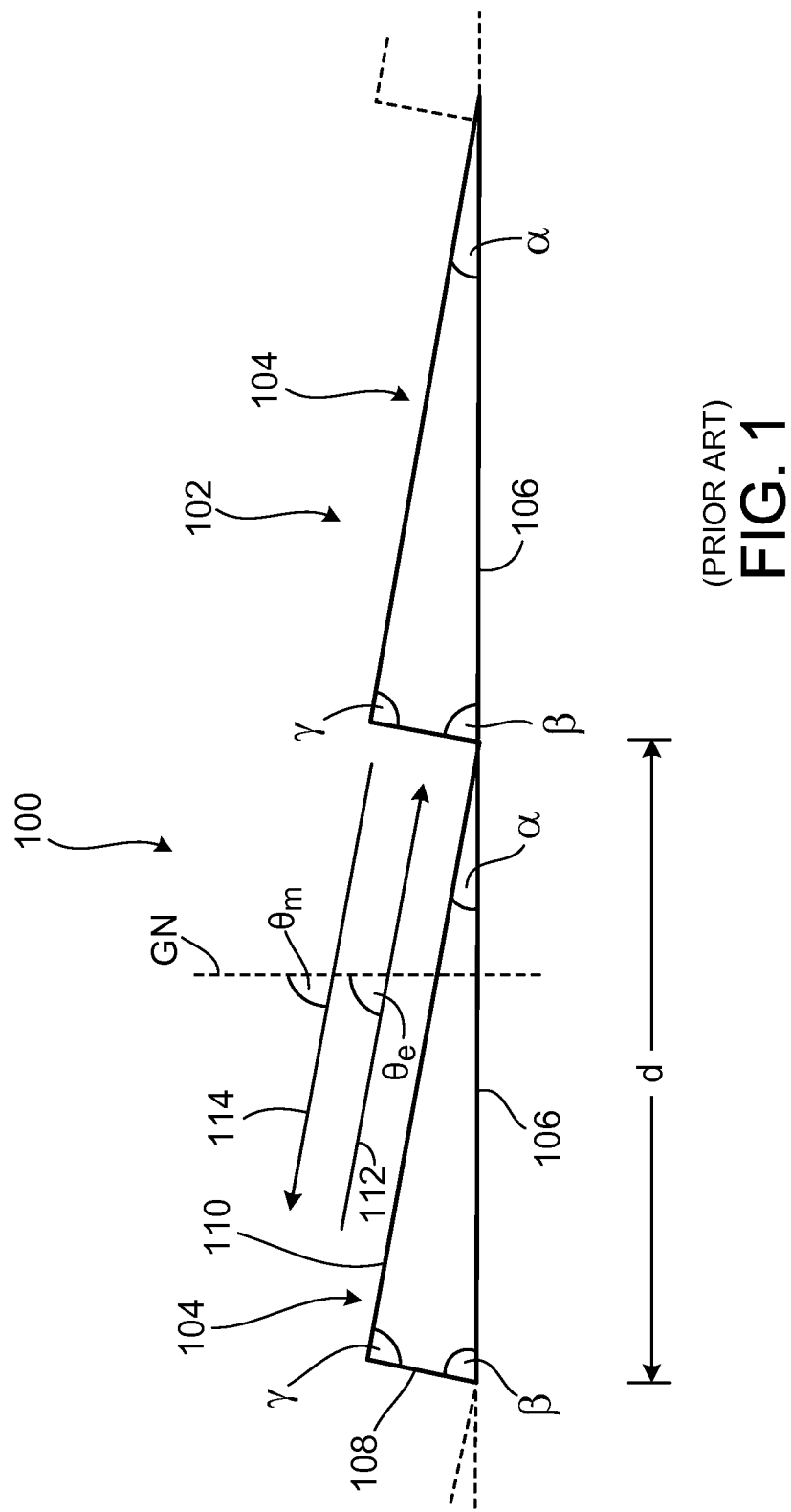
FIG. 1 shows an optical arrangement including a diffraction grating in accordance with the prior art and in an illustration of a detail.

Before the present disclosure is considered in detail, the prior art is firstly described briefly once more with reference to FIG. 1, in order to emphasize the differences and advantages of the present disclosure by comparison with the prior art with the aid of this description.

The first step to this end is to consider an example which is described in the document U.S. Pat. No. 6,067,197. In a first case, the incident light beam 112 in accordance with FIG. 1 contains light of a wavelength $\lambda$ of 248.4 nm, which is emitted by a KrF laser. In a second case, the light beam 112 with a wavelength $\lambda$ of 193.3 nm is emitted by an ArF laser.

It was found in U.S. Pat. No. 6,067,197 that the 84th diffraction order (m=84) in the case of the KrF laser, and the 108th diffraction order (m=108) in the case of the ArF laser, simultaneously constitute a blaze order when the grating width d of the diffraction grating 102 is 10.623 μm and the angle $\beta$ of the blaze flanks 108 to the base surface 106 of the diffraction grating 102 is approximately 80°. It is stated there, furthermore, that each of the blaze orders for the respective wavelength is the last propagating diffraction order, that is to say the 85th diffraction order in the case of the KrF laser, and the 109th diffraction order in the case of the ArF laser, both lie below the horizon and therefore do not propagate.

In the case of the known optical arrangement, the diffraction grating 102 is operated in a Littrow arrangement, that is to say it holds that $\theta_e=\theta_m=\theta_L$.

Starting from the abovenamed parameters, equation (2) can be used to calculate the Littrow angle $\theta_L$ at which the diffraction grating is operated for the respective wavelength (248.4 nm and 193.3 nm, respectively). The result for the wavelength $\lambda$=248.4 nm is a Littrow angle $\theta_L$=79.1415° in the 84th diffraction order, and that for the wavelength $\lambda$=193.3 nm is a Littrow angle $\theta_L$=79.297° in the 108th diffraction order.

However, if the condition disclosed in document U.S. Pat. No. 6,762,881 is applied in the form of the equation $$L=\max_{m\geq 1,\ m\in\mathbb{N}}\{(2((m+1)/m)-1)\cdot\sin\theta_L \geq 1\} \quad (3)$$

to the abovenamed example, the result is that the largest possible last propagating diffraction order L for the previously calculated Littrow angle $\theta_L$=79.1415° is the 109th diffraction order in the case of the KrF laser, and for the above-calculated Littrow angle $\theta_L$=79.297° is the 112th diffraction order in the case of the ArF laser.

Both the 109th diffraction order instead of the 84th diffraction order in the case of the KrF laser, and the 112th diffraction order instead of the 108th diffraction order for the ArF laser, once again are somewhat more intense in these blaze orders than in any other. A combination of these two blaze orders in a common grating in accordance with U.S. Pat. No. 6,067,197 is not possible then, however, since both blaze orders involve different grating periods d.

However, it follows in any case from the document U.S. Pat. No. 6,067,197 and generally from the prior art that the angles $\beta$ of the blaze flanks 108 to the base surface 106 of the diffraction grating 102 lie very close to one another ($\beta$=80°, $\theta_L$=79.1415° and 79.297°, respectively).

In accordance with U.S. Pat. No. 6,067,197, the diffraction efficiencies do not exceed 80% in the polarization direction TM either in the 84th diffraction order in the case of the KrF laser, or in the 108th diffraction order in the case of the ArF laser, and this is clearly remote from a perfect blaze effect.

An optical arrangement 10 according to the disclosure which has a diffraction grating 12 will now be described with reference to FIG. 2. The diffraction grating 12 has a multiplicity of diffraction structures 14 which follow one another periodically at the spacing of a grating period d and are arranged along a base surface 16. The individual diffraction structures 14 of the diffraction grating 12 designed as an echelle grating respectively have a blaze flank 18 and an antiblaze flank 20. The blaze flanks 18 are arranged at an angle β to the base surface 16, and the antiblaze flanks 20 at an angle α. Two neighbouring blaze and antiblaze flanks 18, 20 respectively enclose an apex angle γ.

The optical arrangement 10 further has a light source (not illustrated in more detail) which emits a light beam 22 with light of wavelength λ.

The light source is, for example, an ArF laser which emits coherent light of wavelength λ=193.3 nm.

In the case of the optical arrangement 10 according to the disclosure, the diffraction grating 12 is operated in a Littrow arrangement, that is to say the incidence angle $\theta_e$ is equal to the emergence angle $\theta_m$ in the diffraction order m considered, the incidence angle $\theta_e$ being designated in this case as the Littrow angle $\theta_L$. All abovenamed angles $\theta_e$, $\theta_m$ and $\theta_L$ are measured in relation to the grating normal GN, which is perpendicular to the base surface 16.

However, unlike the known optical arrangements and known diffraction gratings, in the case of the optical arrangement according to the disclosure and the diffraction grating according to the disclosure there is no compliance with the requirement, known from the prior art, that the angle β of the blaze flanks 18 to the base surface 16 is approximately equal to the Littrow angle $\theta_L$.

Rather, the angle β of the blaze flanks 18 to the base surface 16 is selected as a function of a predetermined Littrow angle $\theta_L$ such that the diffraction efficiency is at least approximately maximal in one of the largest propagating diffraction orders m, for which the condition $(2((m+1)/m)-1)\sin\theta_L \geq 1$ is still fulfilled, and for at least one polarization direction (TE or TM).

In the present description, consideration is given to the two fundamental polarization directions, which are perpendicular to one another, the polarization direction TE relating by definition to the case where the electric field vector of the light oscillates perpendicular to the incidence plane, which is formed from the incidence direction of the light beam 22 and the grating normal GN. The polarization direction TM correspondingly denotes the case where the electric field vector of the light beam 22 oscillates parallel to the incidence plane. Unpolarized light can be regarded as a mixture of the two polarization states. The diffraction efficiency for unpolarized light is yielded simply as the mean value from the diffraction efficiencies for the two fundamental cases of the polarization directions TE and TM.

In the case of the optical arrangement 10 according to the disclosure, the angle β of the blaze flanks 18 to the base surface 16 is thus selected as a function of the Littrow angle $\theta_L$. It has surprisingly been found here that for the diffraction grating 12 in the case of the selection of an angle β which deviates upwards by more than 1.5°, in particular 4° to 10°, from the Littrow angle $\theta_L$, the maximum possible diffraction efficiency of virtually 100% for an ideally conducting grating material in one of the largest propagating diffraction orders can simultaneously be achieved even in both polarization directions. This rise in the diffraction efficiency in the blaze order by comparison with the diffraction efficiencies of known optical arrangements and diffraction gratings is reached, in particular, whenever the apex angle γ is 90°, wherein it is also possible within the scope of the disclosure for γ to deviate from 90° by 1.5° downwards or upwards.

With the aid of the optical arrangement according to the disclosure and the diffraction grating according to the disclosure, a diffraction efficiency in the blaze order of 100% can be achieved for diffraction gratings made from materials of infinite conductivity, and the diffraction efficiency is reduced only by the absorption of the light by the material in the case of diffraction gratings made from materials with a finite conductivity.

It follows that there exists a "perfect" angle $\beta_{perfect} > \theta_L$ in the case of which the diffraction efficiency is 100% in a blaze order in the case of a diffraction grating 12 made from a material of infinite conductivity. For this angle $\beta_{perfect}$, the diffraction efficiency in all other diffraction orders virtually vanishes, that is to say virtually no scattered light or interfering light is diffracted into other diffraction orders. This case is denoted as perfect blaze effect in accordance with the technical book quoted at the beginning Whereas it is stated in the paper mentioned at the beginning that such a perfect blaze effect cannot be achieved simultaneously for the two polarization directions TE and TM, this statement is refuted by the present disclosure.

Figure 2:
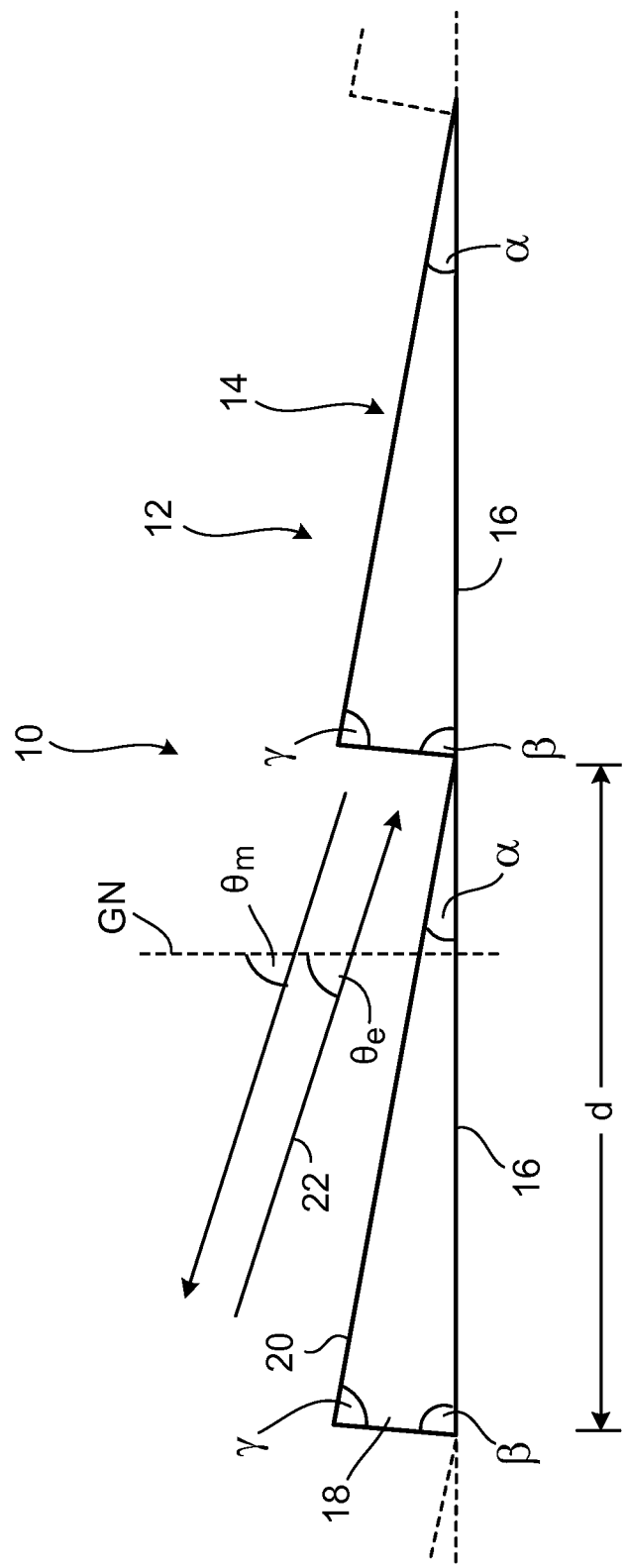
FIG. 2 shows an optical arrangement according to the disclosure including a diffraction grating according to the disclosure in an illustration of a detail.

Whereas the prior art has always insisted on tuning the Littrow angle $\theta_L$ to the angle β of the blaze flanks to the base surface, specifically such that the two are virtually equal so that the incident light beam is perpendicular to the blaze flanks 108 in accordance with FIG. 1, in the arrangement 10 according to the disclosure the light beam 22 is not incident on the blaze flanks 18 perpendicularly, as is illustrated in FIG. 2.

It is described below with the aid of exemplary embodiments how a diffraction grating and its position in an optical arrangement are determined in order to obtain a diffraction efficiency which is as high as possible. The apex angle γ is γ=90° in these examples.

By way of example, use is made as light source of an ArF laser which emits light at a wavelength of 193.3 nm.

Furthermore, a Littrow angle $\theta_L$ is fixed at which the light beam 22 in FIG. 2 is intended to be incident on the diffraction grating 12.

$\theta_L=78°$ is fixed in the present example.

Subsequently, a diffraction order m is determined which belongs to the largest propagating diffraction orders and which still fulfils the condition $(2((m+1)/m)-1)\sin\theta_L \geq 1$. Equation (3), which specifies the largest possible last diffraction order, can be used for this purpose as a sufficient, but not necessary condition.

The 89th diffraction order is yielded as the largest possible last propagating order L for the Littrow angle $\theta_L=78°$, that is to say L=89.

The grating period d can be determined by equation (2) from the parameters, now available, of λ, $\theta_L$ and m=L=89. The grating period d=8794 nm is yielded with the aid of the present exemplary parameters.

On the basis of the abovenamed parameters, the angle β of the blaze flanks 18 to the base surface 16 of the diffraction grating 12 is now selected with the stipulation that the diffraction efficiency is at least approximately maximal in one of the largest propagating diffraction orders m for which the condition $(2((m+1)/m)-1)\sin\theta_L \geq 1$ is still fulfilled, here the largest possible last propagating diffraction order L=89, for example. As may be checked by numerical calculations using commercial software for grating efficiency calculation for diffraction gratings with materials of infinite conductivity, the perfect angle $\beta_{perfect}$ is 83.9° for the abovenamed parameters, that is to say 5.9° larger than the fixed Littrow angle $\theta_L$.

For the angle $\beta_{perfect}$=83.9°, the diffraction efficiency $\eta_{TE}$ in the polarization direction TE is: $\eta_{TE}$=99.3%. For the angle $\beta_{perfect}$=83.9°, the diffraction efficiency $\eta_{TM}$ in the polarization direction TM is: $\eta_{TM}$=99.8%. This is a perfect blaze effect, even being so for both polarizations TE and TM.

The "unpolarized" diffraction efficiency in the 89th diffraction order is thus $\eta_L$=99.5% for L=89. It thus follows that only 0.5% of directed scattered light flows in other diffraction orders (m≠89), and thus virtually vanishes, for the angle $\beta_{perfect}$ of the blaze flanks 18 to the base surface 16 of the diffraction grating 12. The abovenamed example is thus one which implements a perfect blaze arrangement and therefore refutes the statements made in the paper mentioned at the beginning and the technical book mentioned at the beginning, namely that it is impossible to achieve 100% diffraction efficiency simultaneously in the polarization directions TE and TM for a diffraction grating made from a material of infinite conductivity.

The deviation of the angle $\beta=\beta_{perfect}$ from the Littrow angle $\theta_L$ in the example described above is 5.9°, and is thus larger by an entire order of magnitude than the customary known acceptable deviation of the angle β from the Littrow angle $\theta_L$ for a high blaze effect which, as is known, should not be larger than 1° in accordance with the prior art.

As already mentioned, it is not required for the diffraction order m considered, in which an increased blaze effect occurs, to be the largest possible last propagating diffraction order L according to equation (3), but it is also the case that high diffraction orders m which lie near the largest possible last propagating L, that is to say for which it holds, for example, that: m=L−3, L−2, L−1, L+1, L+2, L+3, have similarly positive diffraction efficiency properties as the actual Littrow order L itself. A deviation of the diffraction orders from the largest possible last propagating order can lie in the range of 1 to 20, such as, for example, 1 to 10.

Figure 3:
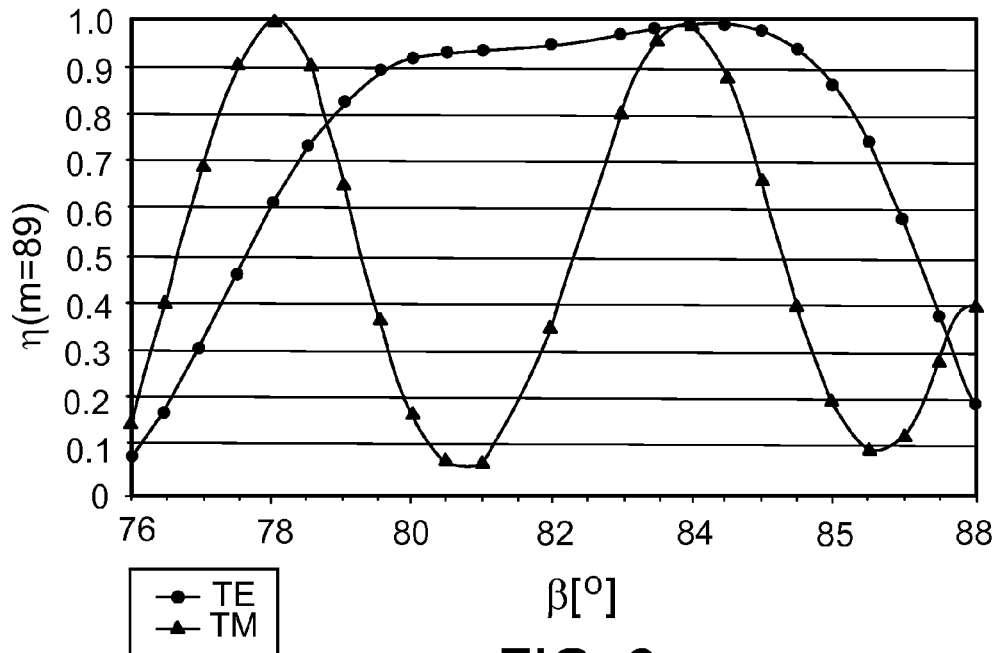
FIG. 3 shows a diagram which shows the dependence of the diffraction efficiency in a high diffraction order on the angle $\beta$ of the blaze flanks to the base surface of the diffraction grating for a material of infinite conductivity.

FIG. 3 illustrates the profile of the diffraction efficiency η of the 89th diffraction order as a function of the angle β of the blaze flanks 18 to the base surface 16 of the diffraction grating 12 for the parameters, specified in the abovenamed example, for a material of infinite conductivity, that is to say $\theta_L$=78°, λ=193.3 nm, γ=90°, d=8794 nm.

As follows from the curve profiles, given the angle $\beta=\beta_{perfect}$=83.9°, the diffraction efficiency η for the 89th diffraction order is maximal both for the polarization direction TE and for the polarization direction TM, and is virtually 100% there.

It is true that for an angle β≈78°, which thus corresponds to the Littrow angle $\theta_L$, the diffraction efficiency η of the 89th diffraction order has a maximum of virtually 100% as well, but only for the polarization direction TM, whereas the diffraction efficiency η for the polarization direction TE is only approximately 60% for this angle β, the result being that a total diffraction efficiency of only approximately 80% is yielded for this angle β.

Figure 4:
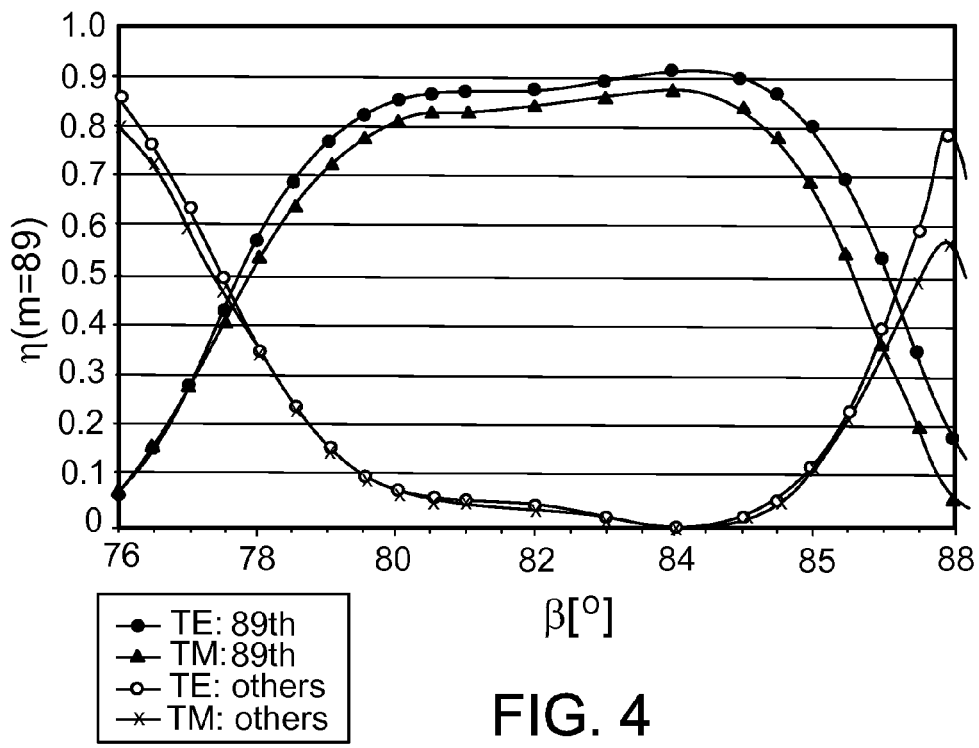
FIG. 4 shows a diagram which illustrates the dependence of the diffraction efficiency in a high diffraction order on the angle $\beta$ of the blaze flanks to the base surface of the diffraction grating but unlike FIG. 3, for a material of finite conductivity, the diagram additionally illustrating the dependence of the total diffraction efficiency on the angle $\beta$ for the other diffraction orders than the high diffraction order.

FIG. 4 shows the profile of the diffraction efficiency η in the 89th diffraction order for the polarization directions TE and TM ("TE: 89th" and "TM: 89th", respectively), and the sum of the diffraction efficiencies η in all other diffraction orders, subdivided in terms of the polarization directions TE and TM ("TE: others" and "TM: others", respectively) for the diffraction grating 12, the diffraction grating 12 now having aluminium instead of an idealized material of infinite conductivity (100% reflectivity) as grating material. The remaining parameters $\theta_L$, λ, γ and d are unchanged by comparison with the example in FIG. 3.

A comparison of FIG. 4 and FIG. 3 shows that the diffraction efficiencies in the 89th diffraction order for the polarization directions TE and TM are once again maximal for the same angle $\beta_{perfect}$≈84.0°, and that the entire light diffracted into the other diffraction orders virtually vanishes. Unlike the case where the diffraction grating 12 has a material of infinite conductivity, the diffraction efficiencies do not reach 100% in the case of aluminium as material for the diffraction grating 12, and are also not identical in the two polarization directions TE and TM. The reason for this lies in the fact that a portion (here approximately 10%) of the incident light is absorbed in the aluminium and therefore is not available for reflection. The small differences between the diffraction efficiencies in the 89th diffraction order in the two polarization directions TE and TM presumably result from the different boundary conditions of the reflection for these two polarization directions.

A further aspect of the disclosure is moreover to be seen from FIG. 4, specifically that the diffraction efficiency η in the 89th diffraction order lies above 80% in a relatively large angular range of the angle β from approximately 80° to approximately 85°, that is to say the diffraction efficiency is at least approximately maximal in the two polarization directions TE and TM in this angular range. This means that given a selection of the angle β which deviates from the perfect angle $\beta_{perfect}$ by some few degrees, a very high diffraction efficiency is always still reached, being above that which can be reached with other deflection gratings and optical arrangements from the prior art. Since, however, the angle β is an important and critical variable in the production of diffraction gratings, the substantially larger angular tolerance for the angle β which is rendered possible by the disclosure facilitates the production of these gratings.

In the example of FIG. 4, a diffraction efficiency in the blaze order of more than 85% is reached with angles β which are larger than 80.5° and smaller than 85°, and this is better than the highest 80% that is indicated in the examples in the document U.S. Pat. No. 6,067,197, and is also better than the highest 82% which is reached in the examples in U.S. Pat. No. 6,762,881. Consequently, in the case of the diffraction grating 12 according to the disclosure and the optical arrangement 10 according to the disclosure the directed scattered light in other diffraction orders is also smaller than approximately 5%, and consequently smaller than the scattered light as is known for other blaze arrangements.

The angular tolerance of the angle β, which is approximately 4.5° in the example in accordance with FIG. 4, within which the diffraction efficiency in the polarization directions TE and TM is at least approximately maximal, likewise lies an order of magnitude above the angular tolerance of a maximum of approximately 0.5°, such as the normal known acceptable angular tolerance of the angle β from the optimal angle β may be for a high blaze effect.

It may be noted at this juncture that the angular tolerance of the angle β for the purpose of attaining a perfect blaze effect is smaller than the previously specified angular tolerance of the angle β for attaining a high blaze effect. If the maximum permitted sum of the diffraction efficiencies in all other diffraction orders than the blaze order is set at 2%, the angle β can then lie in the interval between 83° and 85°. However, even an angular tolerance of 2° for the angle β is still larger by the factor of approximately four than the normal known acceptable deviation of the angle β from the optimal angle β for a high blaze effect.

Figure 5:
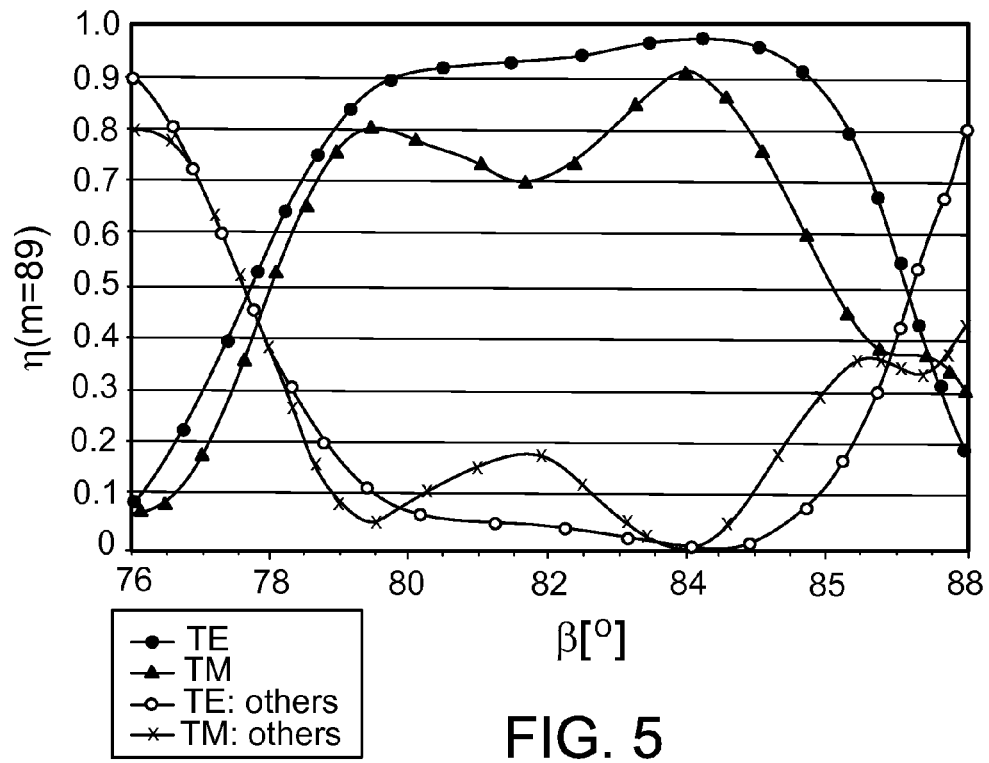
FIG. 5 shows a diagram which shows the dependence of the diffraction efficiency in a high diffraction order on the angle $\beta$ of the blaze flanks to the base surface of the diffraction grating for a further material and another wavelength.

FIG. 5 shows in a diagram the profile of the diffraction efficiency η in the 89th diffraction order for the polarization directions TE and TM, as well as the sum of the diffraction efficiencies in all other diffraction orders for the polarization directions TE and TM for the diffraction grating 12, the diffraction grating 12 now having gold as grating material.

The Littrow angle was once again fixed at 78°, the apex angle γ is 90°, the grating period d was determined at 50.044 μm, and the wavelength λ is 1100 nm here.

Whereas it was not possible to establish for the diffraction efficiency η in the polarization direction TE a substantial difference from the case of the wavelength λ=193.3 nm, a change occurs for the polarization direction TM by comparison with FIG. 4, which goes in the direction of infinite conductivity as was illustrated in FIG. 3. The reason for this resides substantially in the clearly higher conductivity of gold at λ=1100 nm by comparison with the conductivity for aluminium at λ=193.3 nm. This increased conductivity of gold changes the diffraction efficiency response more in the direction of infinite conductivity of FIG. 3. Despite the changed response, it remains appropriate to state that the diffraction efficiency for an angle $\beta=\beta_{perfect}$ of approximately 84°, which is thus clearly larger than the Littrow angle $\theta_L$, is maximal, and the high angular tolerance of the angle β in an interval of approximately 5° within which the diffraction efficiency is at least approximately maximal is valid in this case at least for the polarization direction TE. The angular tolerance of the angle β is reduced to approximately 1 to 3° for the polarization direction TM.

A further aspect of the present disclosure is described below with reference to FIGS. 6 and 7.

The above-described exemplary embodiments relate to the so-called "classical" diffraction in the case of which both the incident light beam 22 and the diffracted light lie in one plane with the grating normal GN.

In order, by way of example, to separate the diffracted emergent light beams from the incident light beam 22, the optical arrangement 10 can also be operated in so-called "conical" diffraction. The deviation of the "conical" diffraction from the "classical" diffraction can be described via an inclination angle δ, it then being desirable to transform the equation (1) as follows:

$$m \cdot \frac{\lambda}{d} = \cos\delta(\sin\theta_e + \sin\theta_m), \quad (4)$$

$\theta_e$ again describing the incidence angle, and $\theta_m$ the diffraction angle in the blaze order, both angles to the grating normal GN being measured in the plane of the "classical" diffraction, and δ being the inclination angle between the incident light beam 22 and this plane. $\theta_e$ and $\theta_m$ differ from one another only slightly in the case of an arrangement of the diffraction grating 12 close to a Littrow arrangement. As an example, FIG. 8 illustrates the incident light beam 22, $\theta_e$ and the inclination angle δ.

Equation (2) for a Littrow arrangement with conical deviation is then as follows:

$$\sin\theta_L = m\frac{\lambda}{2d \cdot \cos\delta}. \quad (5)$$

It may be remarked at this juncture that equation (3) for determining the largest propagating diffraction order is also valid in the case of the conical diffraction, in which the emergence beams are separated from the incident light beam 22.

Figure 6:
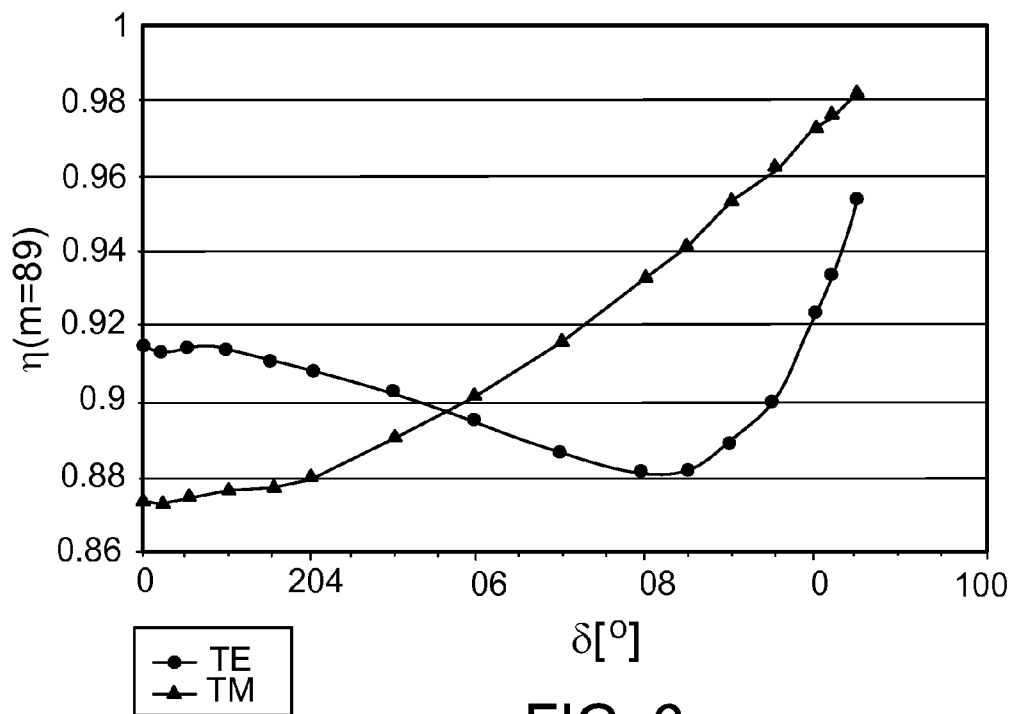
FIG. 6 shows a diagram which shows the dependence of the diffraction efficiency in the same diffraction order as in FIG. 4 for a specific angle $\beta$ of the blaze flanks on the inclination angle $\delta$ at which the diffraction grating is inclined relative to the incidence plane of the light.

Plotted in a diagram in FIG. 6 for the polarization directions TE and TM as a function of the inclination angle δ is the diffraction efficiency η for the example in FIG. 4, that is to say for the case that the diffraction grating 12 has aluminium as grating material, and for a Littrow angle $\theta_L$=78°, a wavelength λ=193.3 nm, an apex angle γ=90° and for the angle $\beta=\beta_{perfect}$=84° of the blaze flanks 18 to the base surface 16. The grating period d was determined in this case by equation (5).

The diffraction efficiency values in accordance with FIG. 4 for β=84° result for an inclination angle δ=0°. With increasing inclination angle δ, the diffraction efficiency increases continuously for the polarization direction TM, while for the polarization direction TE it firstly decreases substantially continuously to an inclination angle δ≈60°, and thereafter rises again strongly. The diffraction efficiency remains substantially constant up to an inclination angle δ≈40° on average for the polarization directions TE and TM. For larger inclination angles δ>40°, the diffraction efficiency improves even further and approaches close to 100%.

This positive effect of the inclination angle δ on the diffraction efficiency can now be utilized advantageously in the exemplary embodiment in accordance with FIG. 4. If, as in the classical diffraction in accordance with FIG. 4, the Littrow angle $\theta_L$ is fixed at $\theta_L$=78°, and the largest possible last propagating diffraction order L in accordance with the equation (3) is determined, and if the angle β of the blaze flanks 18 to the base surface 16 of the diffraction grating 12 is selected at $\beta=\beta_{perfect}$ ($\beta_{perfect}$≈84°) and the apex angle γ is selected at γ=90°, and if, in addition, the inclination angle δ is selected near 90°, for example in the range from 60° to near 90°, then an optical arrangement 10 is obtained in the case of which virtually 100% of the light is diffracted into the blaze order L despite a grating material of finite conductivity.

Figure 7:
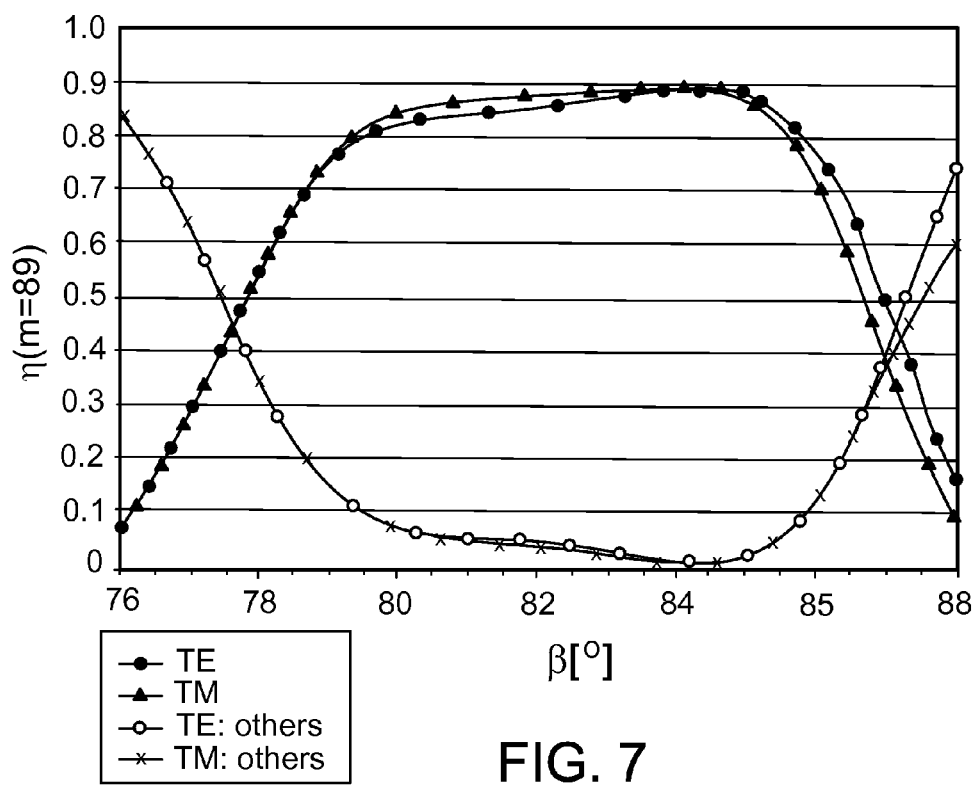
FIG. 7 shows a diagram similar to FIG. 4, although

Illustrated in a further diagram in FIG. 7, as a function of the angle β of the blaze flanks 18 to the base surface 16 of the diffraction grating 12, is the diffraction efficiency η in the 89th diffraction order for the diffraction grating 12 (grating material aluminium) and a wavelength λ=193.3 nm and the same parameters γ, $\theta_L$ (γ=90°, $\theta_L$=78°, in each case) as in the exemplary embodiment in accordance with FIG. 4 for the polarization directions TE and TM, as well as the sum of all the diffraction efficiencies in the other diffraction orders then the 89th diffraction order for the polarization directions TE and TM. Unlike FIG. 4, the inclination angle δ=40° was selected, whereas in FIG. 4 the inclination angle δ=0°. The grating period d was calculated to be d=11.48 μm for δ=40° in accordance with equation (5).

As emerges from FIG. 7, the splitting of the polarization of the diffraction efficiency between the two polarization directions TE and TM is particularly slight for this inclination angle δ=40°, and lower than in the case of the exemplary embodiments in accordance with FIG. 4, as is already to be expected from the diagram in accordance with FIG. 6. All the properties of the optical arrangement 10 in the case of the parameters in accordance with FIG. 7 for the inclination angle δ=40° are otherwise the same as for the inclination angle δ=0° in accordance with FIG. 4. This means, in particular, that even the angular tolerance of the angle β of a number of degrees (here approximately) 4.5° is maintained on a very high level of the diffraction efficiency (>85%).

By way of example, the diffraction grating 12 is used as an end mirror of a laser resonator for bandwidth narrowing. In this case, the diffraction grating 12 can be operated at an inclination angle δ=0°.

What is claimed is:

1. An optical arrangement, comprising:
    a diffraction grating comprising a plurality of diffraction structures following one another periodically at a spacing of a grating period (d); and
    a base having a base surface supporting the plurality of diffraction structures,
    wherein each of the plurality of diffraction structures comprises:
    a blaze flank; and
        an antiblaze flank, the blaze flanks being arranged at an angle (β) relative to the base surface, the antiblaze flanks being arranged at an angle (α) relative to the base surface, and neighbouring blaze and antiblaze flanks enclosing an apex angle (γ), and
    wherein, during use:
        the optical arrangement is configured so that an incident light beam at a wavelength (λ) is arranged at a Littrow angle ($\theta_L$) relative to a grating normal of the diffraction grating;
        the angle (β) is greater than the Littrow angle ($\theta_L$) by at least 4°;
        for at least one polarization direction, a diffraction efficiency is at least approximately maximal in a diffraction order m, which fulfils the condition $(2((m+1)/m)-1)\sin \theta_L \geq 1$; and
        the diffraction order m is a largest possible last propagating diffraction order or the diffraction order m deviates from the largest possible last propagating diffraction order by a number which lies in a range from 1 to 20.

2. The optical arrangement of claim 1, wherein the angle (β) is greater than the Littrow angle ($\theta_L$) by a value in a range from 4° to 10°.

3. The optical arrangement of claim 1, wherein the angle (β) is greater than the Littrow angle ($\theta_L$) by a value in a range from 4° to 8°.

4. The optical arrangement of claim 1, wherein each diffraction efficiency of two polarizations is at least approximately maximal in the diffraction order m.

5. The optical arrangement of claim 1, wherein the apex angle (γ) is in a range from 88.5° to 91.5°.

6. The optical arrangement of claim 1, wherein the angle (β) is in a range from 82° to 86°, and the Littrow angle ($\theta_L$) is in a range from 78° to 80°.

7. The optical arrangement of claim 1, wherein, during use, the diffraction grating is inclined by an inclination angle (δ) relative to an incidence plane of the light beam.

8. The optical arrangement of claim 7, wherein the inclination angle (δ) is in a range from 35° to near 90°.

9. The optical arrangement of claim 1, wherein the diffraction order m is the largest possible last propagating diffraction order.

10. The optical arrangement of claim 1, wherein the diffraction order m deviates from the largest possible last propagating diffraction order by a number which lies in a range from 1 to 20.

11. The optical arrangement of claim 1, wherein the diffraction order m deviates from the largest possible last propagating diffraction order by a number which lies in a range from 1 to 10.

12. The optical arrangement of claim 1, further comprising a light source configured to emit coherent light at the wavelength (λ).

13. A method, comprising:
    providing the optical arrangement of claim 1; and
    using the diffraction grating as an end mirror of a laser resonator.

14. A method, comprising:
    selecting a Littrow angle ($\theta_L$) at which coherent light of a wavelength (λ) is to be incident on a diffraction grating relative to a grating normal of the diffraction grating;
    selecting a diffraction order m which satisfies the condition $(2((m+1)/m)-1)\sin \theta_L \geq 1$, where the diffraction order m is a largest possible last propagating diffraction order for the Littrow angle ($\theta_L$) or the diffraction order m deviates from the largest possible last propagating diffraction order for the Littrow angle ($\theta_L$) by a number which lies in a range from 1 to 20;
    determining a grating period d of the diffraction grating in accordance with the equation: $d = m\lambda/(2\sin \theta_L)$;
    selecting an angle (β) as a function of the diffraction order m and the grating period d from an angular range in which a diffraction efficiency in the diffraction order m is at least approximately maximal; and
    providing the diffraction grating which comprises a plurality of diffraction structures following one another periodically at a spacing of the grating period (d) and arranged along a base surface, each diffraction structure comprising a blaze flank arranged at the angle (β) relative to the base surface.

15. The method of claim 14, wherein the diffraction order m is determined as the largest possible last propagating diffraction order L in accordance with the equation:

$$L = \max_{m \geq 1, \, m \in \mathcal{N}} \{(2((m+1)/m)-1)\sin \theta_L \geq 1\}.$$

16. The method of claim 14, wherein the diffraction order m is deviates from the largest possible last propagating diffraction order L by a number which is in a range from 1 to 20.

17. The method of claim 14, wherein the angle (β) is selected so that each diffraction efficiency of two polarization directions is at least approximately maximal in the diffraction order m.

18. The method of claim 14, wherein the apex angle (λ) is from 88.5° to 91.5°.

19. The method of claim 14, wherein the grating period (d) is determined in accordance with the equation: $d = m\lambda/(2\sin \theta_L \cos \delta)$, δ being an inclination angle at which the diffraction grating is inclined to the incidence plane of the light beam.

20. The method of claim 14, wherein the angle (β) is greater than the Littrow angle ($\theta_L$) by at least 4°.

21. The method of claim 14, wherein the angle (β) is greater than the Littrow angle ($\theta_L$) by a value in a range from 4° to 8°.

22. The method of claim 14, wherein the angle (β) is greater than the Littrow angle ($\theta_L$) by a value in a range from 4° to 10°.

* * * * *

UNITED STATES PATENT AND TRADEMARK OFFICE
CERTIFICATE OF CORRECTION

PATENT NO.         : 8,441,729 B2
APPLICATION NO.    : 12/822415
DATED              : May 14, 2013
INVENTOR(S)        : Bernd Kleemann Page 1 of 1

It is certified that error appears in the above-identified patent and that said Letters Patent is hereby corrected as shown below:

In the Specification:

Column 10, Line 24, delete "beginning" insert --beginning.--;

Column 14, Line 66, delete "approximately)4.5°" insert --approximately 4.5°)--;

In the Claims:

Column 16, Line 38, Claim 15, delete " $L = \max_{m \geq 1, m \in \mathbb{N}} \{(2((m + 1)/m) - 1) \sin \theta_L \geq 1\}.$ "

insert -- $L = \max_{m \geq 1, m \in \mathbb{N}} \{(2((m + 1)/m) - 1) \sin \theta_L \geq 1\}.$ --;

Column 16, Line 42, Claim 16, delete "1to" insert --1 to--;

Column 16, Line 47, Claim 18, delete "(λ)" insert --(γ)--;

Column 16, Line 51, Claim 19, delete "δbeing" insert --δ being--.

Signed and Sealed this
Eighth Day of October, 2013

Teresa Stanek Rea
*Deputy Director of the United States Patent and Trademark Office*